United States Patent
Castellucci et al.

(10) Patent No.: US 8,763,078 B1
(45) Date of Patent: Jun. 24, 2014

(54) SYSTEM AND METHOD FOR MONITORING AUTHENTICATION ATTEMPTS

(71) Applicant: Palantir Technologies, Inc., Palo Alto, CA (US)

(72) Inventors: Ryan Castellucci, Palo Alto, CA (US); Nathan Gettings, Palo Alto, CA (US); Geoff Belknap, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 13/827,201

(22) Filed: Mar. 14, 2013

(51) Int. Cl.
*G06F 21/00* (2013.01)
*H04L 29/06* (2006.01)

(52) U.S. Cl.
CPC ..................... *H04L 63/08* (2013.01)
USPC .................................................. 726/1; 726/5

(58) Field of Classification Search
None
See application file for complete search history.

(56) References Cited

U.S. PATENT DOCUMENTS

2010/0162371 A1* 6/2010 Geil ................................. 726/5
2012/0101952 A1* 4/2012 Raleigh et al. ................ 705/304

OTHER PUBLICATIONS

Reedy, Sarah, "Policy and Charging Rules Function (PCRF)," published by Light Reading.com, United States, last accessed on Dec. 10, 2013, 4 pages.

* cited by examiner

*Primary Examiner* — Jeffrey Pwu
*Assistant Examiner* — Nega Woldemariam
(74) *Attorney, Agent, or Firm* — Hickman Palermo Truong Becker Bingham Wong LLP

(57) ABSTRACT

When an authentication attempt is made to gain access to a secure environment is made, a notification is transmitted to the user associated with the user identification used in the authentication attempt. If the user who receives the notification did not make the authentication attempt, then the user alerts the appropriate parties of a breach in security.

22 Claims, 4 Drawing Sheets

SYSTEM AND METHOD FOR MONITORING AUTHENTICATION ATTEMPTS

BACKGROUND OF THE INVENTION

1. Field of the Invention

The present disclosure relates generally to computer system security and, more specifically, to a system and method for monitoring authentication attempts.

2. Description of the Related Art

Remote users are typically allowed to access a local area network (LAN) via a virtual private network (VPN) service. To access the LAN, a remote user typically authenticates with the VPN service by providing a unique user name and password combination. Once authenticated, the user is able to access the LAN as if the user was local to the LAN. More specifically, a user who accesses the LAN via the VPN service has authority to view and modify assets within the LAN, such as documents and emails, as if the user was local to the LAN.

Typically, every authentication attempt made by a user to access the LAN is logged. Auditors are then able to view the authentication logs to identify and address suspicious authentication activity. However, such auditing does not occur in real-time. Therefore, suspicious activity may not be addressed in time resulting in a security compromise of the LAN. Further, activity that may appear to be suspicious to an auditor is often legitimate activity on behalf of the users attempting to access the LAN. However, because the authentication logs do not indicate any context related to the authentication attempts, an auditor is required to investigate each authentication attempt that appears to be suspicious. Such investigations are time consuming and may distract the auditors from investigating suspicious activity that is truly malicious in nature.

As the foregoing illustrates, what is needed in the art is a more robust and efficient mechanism for tracking and monitoring login attempts into a secure environment.

SUMMARY OF THE INVENTION

One embodiment of the invention is computer-implemented method for notifying users when attempts to login into a secure environment are made. The method includes the steps of determining that an authentication attempt has been made by a user and determining that an authentication attempt has been made with credentials belonging to a user, determining that a notification indicating that the authentication attempt has been made should be transmitted to the user, and transmitting the notification to the user.

One advantage disclosed approach/mechanism is that, because a user is notified every time the user allegedly makes an authentication attempt, the user is able to alert the relevant parties if she receives a notification that does not correlate with her authentication activity. Such a notification mechanism enables real-time alerting of suspicious activities, which can then be addressed quickly.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Figure 1:
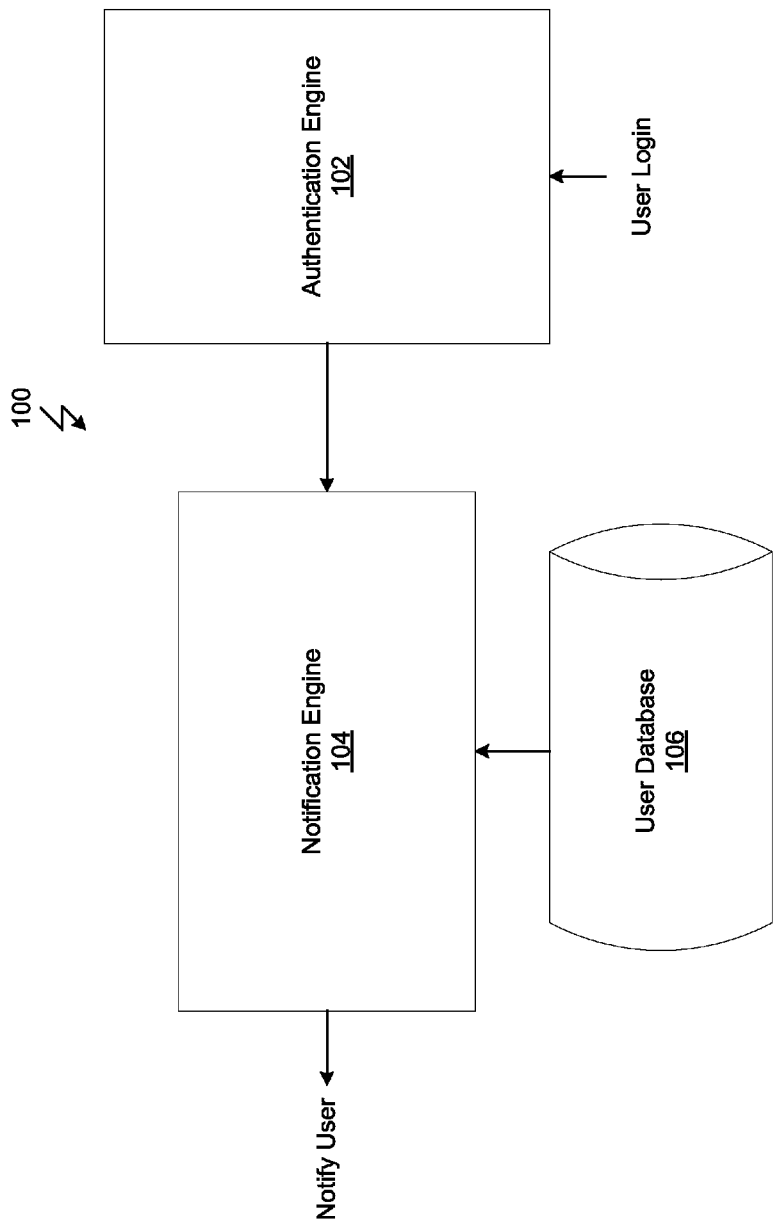
FIG. 1 illustrates a system configured to track user authentication attempts into a secure environment, according to one embodiment of the invention.

FIG. 1 illustrates a system 100 configured to track user authentication attempts into a secure environment, according to one embodiment of the invention. As shown, the system 100 includes, without limitation, authentication engine 102, notification engine 104 and user database 106.

The authentication engine 102 is a software engine that allows users of the system 100 to authenticate and access the system 100 in a secure manner. In one embodiment, the authentication engine 102 provides a virtual private network (VPN) service. Once authenticated, a user is able access any services or assets available in the system 100. In one embodiment, every authentication attempt, successful or unsuccessful, made by a user is logged by the authentication engine 102 in an authentication record. Such a record may be written to a memory unit for persistence and may be accessed by users of the system 100 or by different software modules of the system 100.

The notification engine 104 monitors authentication attempts purportedly made by particular users and then notifies the users of the attempts so the users can verify that the authentication attempts were valid. For every attempted authentication, the notification engine 104 determines the user identification associated with the attempted authentication based on information specified by the authentication engine 102. The notification engine 104 then accesses the user database 106 to identify the particular user associated with the user identification. Based on a set of notification rules, the notification engine 104 then determines whether a notification indicating that the authentication attempt has been made should be sent to the user associated with the user identification. If a notification should be sent, then the notification engine 104 transmits a notification to the user. More specific details related to the operation of the notification engine 104 are described in conjunction with FIG. 2 below.

Figure 2:
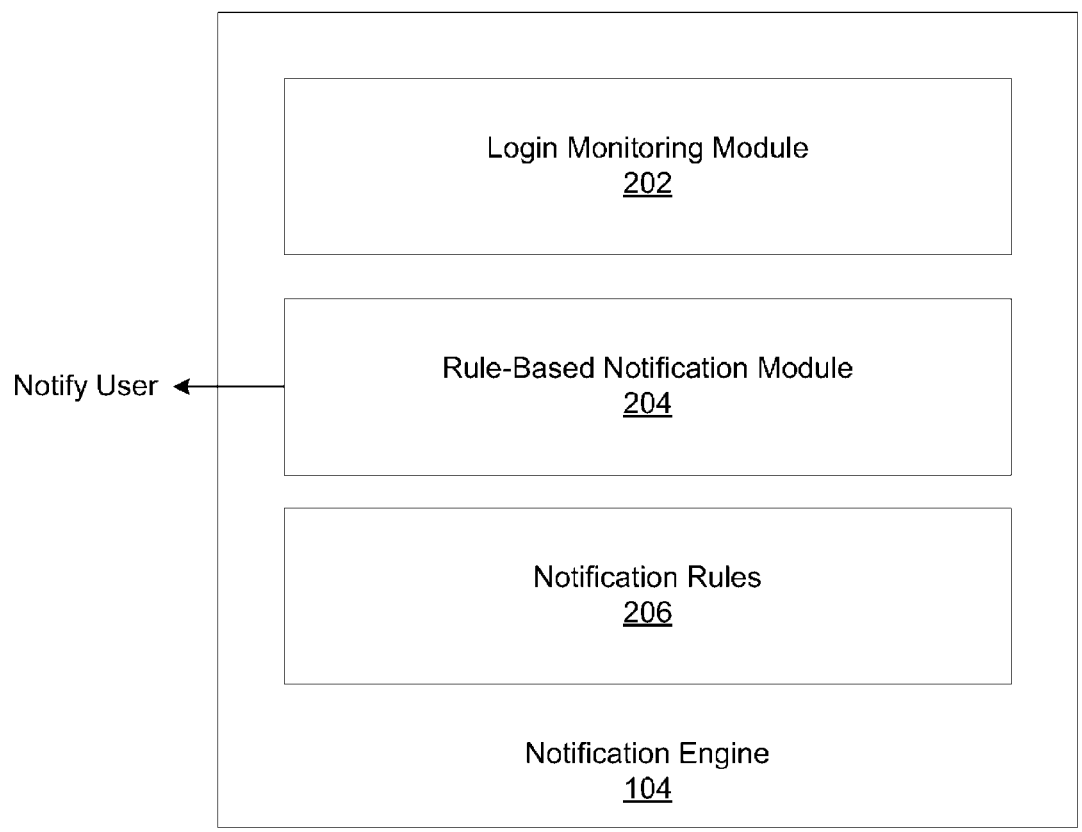
FIG. 2 illustrates a more detailed view of the notification engine of FIG. 1, according to one embodiment of the invention.

FIG. 2 illustrates a more detailed view of the notification engine 104 of FIG. 1, according to one embodiment of the invention. As shown, the notification engine 104 includes, without limitation, a login monitoring module 202, a rule-based notification module 204 and notification rules 206.

In operation, the login monitoring module 202 periodically accesses the authentication engine 102 to identify any new authentication attempts that may have been made by users of the system 100. In one embodiment, the notification engine 104 requests such information from the authentication engine 102 via a pre-identified communication protocol between the authentication engine 102 and the notification engine 105. In another embodiment, the notification engine 104 monitors logins by reading an authentication record maintained by the authentication engine 102 that specifies every authentication attempt made by users.

When the login module 202 identifies a new authentication attempt, the login monitoring module 202 informs the rule-based notification module 204 of the new authentication attempt. In response, the rule-based notification module 204 determines the credentials, i.e., the user identification, with which the authentication attempt was made. In one embodiment, the rule-based notification module 204 extracts the user identification from information retrieved from the authentication engine 102. The rule-based notification module 204 next identifies which users, if any, of the system 100 should be notified of the authentication attempt. Such a determination is based on the notification rules 206.

The notification rules 206 include different rules that are evaluated by the rule-based notification module 204 to determine whether notifications of an authentication attempt should be transmitted and, if so, to which users such notifications should be transmitted. One example of a rule included in the notification rules 206 is a white list that specifies a list of users, where each user in the list does not need to be notified when the user makes an authentication attempt into system 100.

Similarly, a white list could be based on a list of computer networks (e.g., identified by IP address or domain name) from which access attempts should not result in a notification. In another scenario, a rule could specify that only one notification message should be sent for accesses attempts from a particular location, even if multiple attempts are made during the course of a day.

Another example of a rule included in the notification rules 206 is a configurable rule that specifies whether notifications should only be transmitted if an authentication attempt was successful. Another example of a rule included in the notification rules 206 is multi-user notification rule that specifies a list of high-risk users, where, if an authentication attempt is made using the credentials of a high-risk user, then a list of additional users specified by the rule should be notified. Another example of a rule included in the notification rules 206 is a location-based rule that specifies a threshold distance between a location from which a previous authentication attempt using the credentials was made and a location from which the current authentication attempt was made that should trigger the transmission of a notification to the user.

Yet another example of a rule included in the notification rules 206 is a time-based rule that specifies a time period in a day during which notifications are not to be transmitted to the user. Any other rules that dictate the transmission of notification to users when an authentication attempt is made are within the scope of the present invention. Another rule could be based on an analysis of a pattern of login attempts, such as a notification rule that evaluates the latency between two access attempts. For example, if a current login originated from an IP address in California, while a prior access attempt originated from an IP Address in New York, a rule could evaluate the time between the two attempts. In such a case, certain network latency from the requestor would be expected (assuming both attempts were legitimate). Thus, if the rule determined that the time between access attempts did not exceed a an expected amount (possibly because the request is being routed through several proxies), then the rule could trigger a notification message. More sophisticated rules could be based on machine learning or clustering techniques that developed patterns of expected access attempts for a given user or class of users.

In one embodiment, the notification rules 206 are configurable such that a system administrator of the system 100 is able to add, delete, enable and disable rules. In one embodiment, users of the system 100 are divided into different groups. In such an embodiment, for an authentication attempt made using a credential belonging to a particular user, the rule-based notification engine 204 evaluates only a pre-determined subset of the notification rules 206 associated with the group to which the user belongs.

In operation, for each new authentication attempt, the rule-based notification module 204 identifies the set of relevant rules included in the notification rules 206 that should be evaluated to determine which users of the system 100, if any, should be notified of the authentication attempt. The rule-based notification module 204 then evaluates each rule in the set of relevant rules. In one embodiment, the rule-based notification module 204 determines that the notification should be transmitted only if every rule in the set of relevant rules is satisfied. In an alternative embodiment, the rule-based notification module 204 determines that the notification should be transmitted even if any of the rules in the relevant set relevant rules is satisfied.

To evaluate a particular rule, the rule-based notification module 204 determines whether the particular rule is satisfied thus necessitating the transmission of a notification to at least the user associated with the credentials with which the authentication attempt was made. For example, for the location-based rule discussed above, the rule-based notification module 204 determines whether the difference between the location of a previous authentication attempt and the location of the current authentication attempt is greater than the threshold distance specified in the location-based rule. If the distance is greater than the threshold distance, then the rule-based notification module 204 determines that a notification should be transmitted. As another example, for the multi-user notification rule, the rule-based notification module 204 determines whether the user whose credentials were used to make the login attempt is included in the list of high-risk users. If the user is included in the list of high-risk users, then the rule-based notification module 204 determines that a notification should be transmitted to the user as well as to each of the additional users included in the list of additional users specified by the rule.

Once the rule-based notification module 204 determines that notifications of authentication attempt should be transmitted and the users to be notified are identified, the rule-based notification module 204 accesses the user database 106 to retrieve a different notification handle associated with each user to be notified. In one embodiment, the notification handle associated with a particular user is an email address of the user to which the notification is to be transmitted. In another embodiment, the notification handle associated with a particular user is a phone number of the user to which the notification is to be transmitted via a short messaging system (SMS). The notifications are then transmitted to each user to be notified via the associated notification handle. Further, the notification itself can provide a user (or other individual) with a variety of information. For example, in addition to notifying the user of the attempted access itself, a notification message could indicate the location of the attempted access as part of the notification sent to the user. That is, the message could indicate that an attempted access originated from a particular location. For example, a geographic location of an access attempt could be correlated with a source IP address of a VPN connection request. Further, the notification could indicate what rule (or rules) resulted in a given notification message being sent, e.g., "you're receiving this notification based on the following notification rule". Of course, the amount of information could also be tailored to the notification handle. For example, an email could include a detailed description of the access attempt that triggered the notification message. At the same time, an SMS message to the same user could simply provide an alert as to the occurrence of an access attempt triggering the SMS message, leaving it to the recipient to learn further details from another source.

Figure 3:
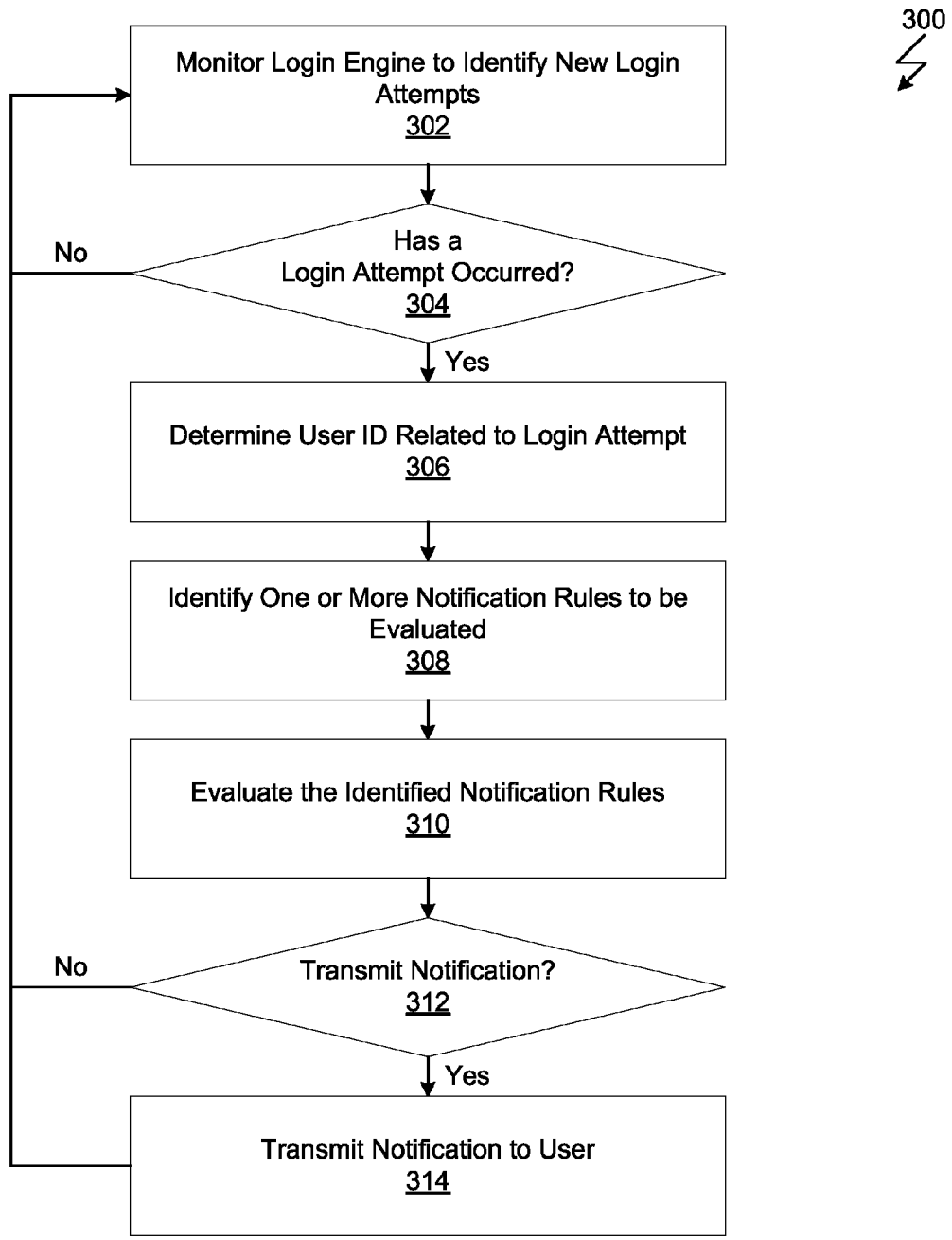
FIG. 3 is a flow diagram of method steps for notifying users of authentication attempts into a secure environment, according to one embodiment of the invention.

FIG. 3 is a flow diagram of method steps for notifying users of logins made into a secure environment, according to one embodiment of the invention. Although the method steps are described in conjunction with the system for FIGS. 1 and 2, persons skilled in the art will understand that any system configured to perform the method steps, in any order, is within the scope of the invention.

A method 300 begins at step 302, where the login monitoring module 202 monitors the authentication engine 102 to identify any new authentication attempts have been made by users of the system 100. At step 304, if a new authentication attempt has not been made, then the method 300 returns to step 302. If, however, a new authentication attempt has been made, then the method 300 proceeds to step 306.

At step 306, the rule-based notification module 204 determines the credentials (user identification) with which the authentication attempt was made. In one embodiment, the rule-based notification module 204 extracts the user identification from information retrieved from the authentication engine 102. At step 308, the rule-based notification module 204 identifies a set of relevant rules included in the notification rules 206 that should be evaluated to determine which users of the system 100, if any, should be notified of the authentication attempt. In one embodiment, the set of relevant rules are determined based on a particular group to which the user belongs, where each group of users is associated with a set of relevant rules included in the notification rules 206.

At step 310, the rule-based notification module 204 then evaluates each rule in the set of relevant rules. Again, to evaluate a particular rule, the rule-based notification module 204 determines whether the particular rule is satisfied thus necessitating the transmission of a notification to at least the user who made the authentication attempt. At step 312, the rule-based notification module 204 determines whether a notification indicating that the authentication attempt has been made should be transmitted. If so, then the method proceeds to step 314. At step 314, the rule-based notification module 204 accesses the user database 106 to retrieve a notification handle associated with a user to be notified. The notification is then transmitted to the user via the associated notification handle.

Figure 4:
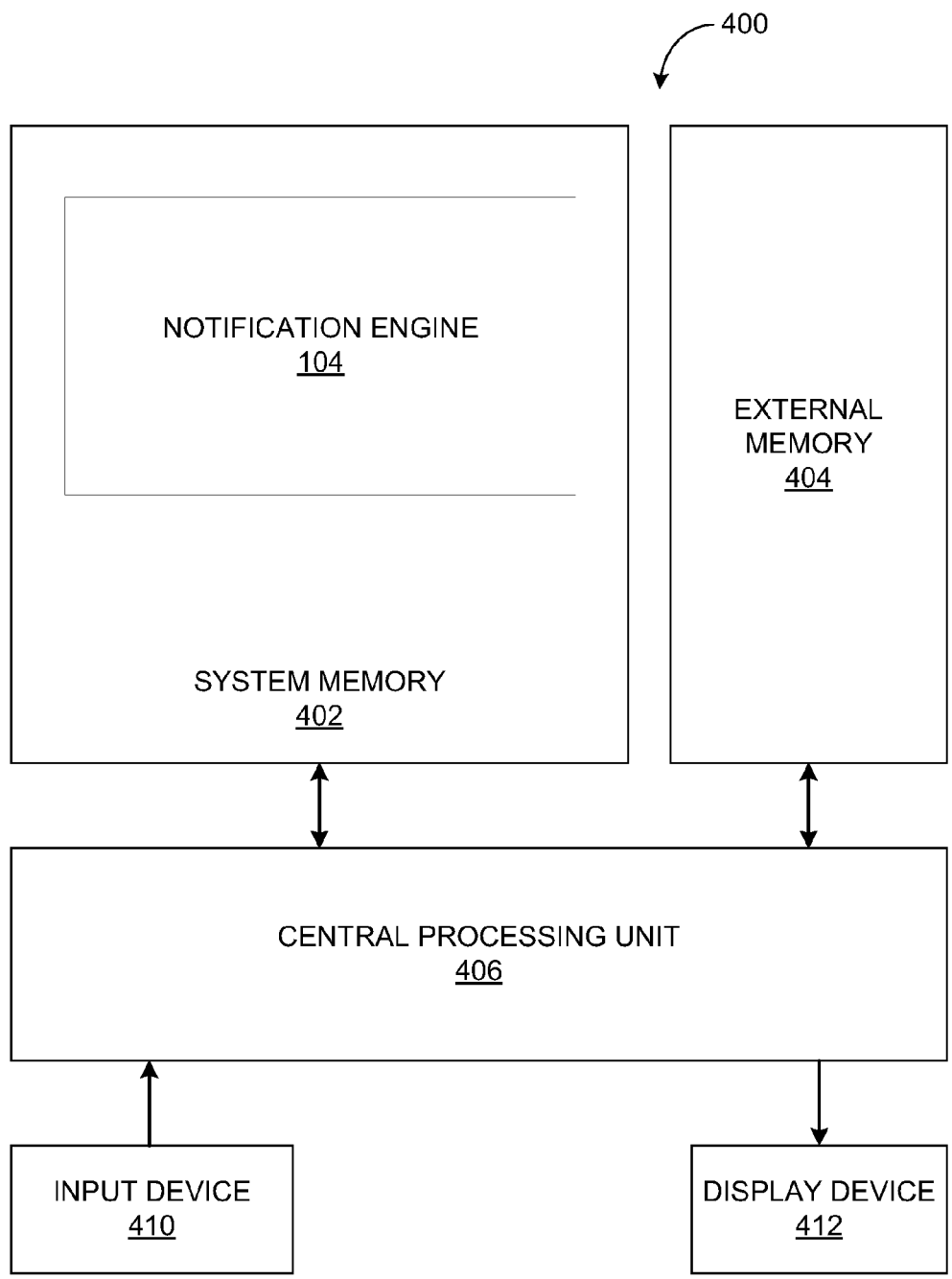
FIG. 4 is an exemplary system configured to implement one or more aspects of the invention.

FIG. 4 is an exemplary system 400 configured to implement one or more aspects of the invention. As shown, the system 400 includes, without limitation, a system memory 402, an external memory 404, a central processing unit (CPU) 406, an input device 410 and an display device 412. The system memory 402 includes the notification engine 104 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the notification engine 104. The input device 410 is an end-user controlled input device, e.g. a mouse or keyboard, that allows a user to manipulate various aspects of the notification engine 104. The display device 412 may be a cathode-ray tube (CRT), a liquid crystal display (LCD) or any other type of display device.

One advantage disclosed approach/mechanism is that, because a user is notified every time the user allegedly makes an authentication attempt, the user is able to alert the relevant parties if she receives a notification that does not correlate with her authentication activity. Such a notification mechanism enables real-time alerting of suspicious activities, which can then be addressed quickly. Further, the notification mechanism provides additional context to auditors when investigating the authentication logs resulting in more efficient investigations. More specifically, if, after receiving a notification, a user indicates that an authentication attempt, which appears to be suspicious, was legitimate, then the auditor does not necessarily have to waste time investigating that authentication attempt.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. Therefore, the scope of embodiments of the present invention is set forth in the claims that follow.

We claim:

1. A computer-implemented method for notifying users when attempts to login into a secure environment are made, the method comprising:
   determining that an authentication attempt has been made with credentials belonging to a user;
   determining that a notification indicating that the authentication attempt has been made is to be transmitted to the user;
   transmitting the notification to the user in response to the authentication attempt and every other time that the user makes an authentication attempt;
   wherein determining that the notification is to be transmitted comprises evaluating a set of notification rules to determine;
   wherein the notification rules specify one or more of: users to which notifications are not to be sent; a threshold distance for use in evaluating a distance a distance between a location from which a previous authentication attempt made with the credentials belonging to the user and a location from which the authentication attempt was made; a time period in a day during which notifications are not to be transmitted.

2. The method of claim 1, wherein a first notification rule in the set of notification rules specifies a list of users to which notifications are not to be transmitted, and evaluating the first notification rule comprises determining whether the user is included in the list of users.

3. The method of claim 1, wherein a first notification rule in the set of notification rules specifies a threshold distance, and evaluating the first notification rule comprises determining whether a distance between a location from which a previous authentication attempt made with the credentials belonging to the user and a location from which the authentication attempt was made is below the threshold distance.

4. The method of claim 1, wherein a first notification rule in the set of notification rules specifies a time period in a day during which notifications are not to be transmitted, and evaluating the first notification rule comprises determining whether a current time does not fall within the time period.

5. The method of claim 1, wherein determining that the authentication attempt has been made comprises accessing a login record maintained by an authentication service, wherein the login record indicates at least the authentication attempt.

6. The method of claim 1, transmitting the notification to the user comprises retrieving a notification handle associated with the user from a user information repository and transmitting the notification to the user via the notification handle.

7. The method of claim 6, wherein the notification handle comprises a telephone number associated with the user and transmitting the notification to the user further comprises transmitting a short message to the telephone number via a short messaging system.

8. The method of claim 1, further comprising determining that the user belongs to a first category that includes high-risk users, and transmitting the notification to an additional user.

9. A non-transitory computer readable storage medium storing instructions that, when executed by a processor, cause the processor to notify users when attempts to login into a secure environment are made, by performing the steps of:
   determining that an authentication attempt has been made with credentials belonging to a user;
   determining that a notification indicating that the authentication attempt has been made is to be transmitted to the user;
   transmitting the notification to the user in response to the authentication attempt and every other time that the user makes an authentication attempt;
   wherein determining that the notification is to be transmitted comprises evaluating a set of notification rules to determine;
   wherein the notification rules specify one or more of: users to which notifications are not to be sent; a threshold distance for use in evaluating a distance a distance between a location from which a previous authentication attempt made with the credentials belonging to the user and a location from which the authentication attempt was made; a time period in a day during which notifications are not to be transmitted.

10. The computer readable medium of claim 9, wherein a first notification rule in the set of notification rules specifies a list of users to which notifications are not to be transmitted, and evaluating the first notification rule comprises determining whether the user is included in the list of users.

11. The computer readable medium of claim 9, wherein a first notification rule in the set of notification rules specifies a threshold distance, and evaluating the first notification rule comprises determining whether a distance between a location from which a previous authentication attempt made with the credentials belonging to the user and a location from which the authentication attempt was made is below the threshold distance.

12. The computer readable medium of claim 9, wherein a first notification rule in the set of notification rules specifies a time period in a day during which notifications are not to be transmitted, and evaluating the first notification rule comprises determining whether a current time does not fall within the time period.

13. The computer readable medium of claim 9, wherein determining that the authentication attempt has been made comprises accessing a login record maintained by an authentication service, wherein the login record indicates at least the authentication attempt.

14. The computer readable medium of claim 9, transmitting the notification to the user comprises retrieving a notification handle associated with the user from a user information repository and transmitting the notification to the user via the notification handle.

15. The computer readable medium of claim 14, wherein the notification handle comprises a telephone number associated with the user and transmitting the notification to the user further comprises transmitting a short message to the telephone number via a short messaging system.

16. The computer readable medium of claim 9, further comprising determining that the user belongs to a first category that includes high-risk users, and transmitting the notification to an additional user.

17. A computer system, comprising:
   a memory; and
   a processor configured to:
   determine that an authentication attempt has been made with credentials belonging to a user,
   determine that a notification indicating that the authentication attempt has been made is to be transmitted to the user,
   transmit the notification to the user in response to the authentication attempt and every other time that the user makes an authentication attempt;
   and to determine that the notification is to be transmitted by evaluating a set of notification rules to determine;
   wherein the notification rules specify one or more of: users to which notifications are not to be sent; a threshold distance for use in evaluating a distance a distance between a location from which a previous authentication attempt made with the credentials belonging to the user and a location from which the authentication attempt was made; a time period in a day during which notifications are not to be transmitted.

18. The computer system of claim 17, wherein the memory includes instructions that cause the processor to determine that an authentication attempt has been made with credentials belonging to a user, determine that a notification indicating that the authentication attempt has been made is to be transmitted to the user, and transmit the notification to the user.

19. A computer-implemented method comprising:
   determining that an authentication attempt has been made with credentials belonging to a user, wherein the authentication attempt is associated with a login to a secure environment;
   determining that a notification indicating that the authentication attempt has been made is to be transmitted to the user by evaluating a set of notification rules to determine;
   wherein a first notification rule in the set specifies a list of users to which notifications are not to be transmitted, and evaluating the first notification rule comprises determining whether the user is in the list of users;
   wherein a second notification rule in the set specifies a threshold distance, and evaluating the second notification rule comprises determining whether a distance, between a first location of a previous authentication attempt with the credentials belonging to the user and a second location from which the authentication attempt was made, is below the threshold distance;

wherein a third notification rule in the set specifies a time period in a day during which notifications are not to be transmitted, and evaluating the third notification rule comprises determining whether a current time does not fall within the time period;

transmitting the notification to the user when at least one of the notification rules is satisfied;

wherein the method is performed using one or more computing systems.

20. The method of claim 19 further comprising determining that the user belongs to a first category that includes high-risk users, and transmitting the notification to an additional user.

21. A computer system, comprising:

a memory; and a processor configured to:

determine that an authentication attempt has been made with credentials belonging to a user, wherein the authentication attempt is associated with a login to a secure environment;

determine that a notification indicating that the authentication attempt has been made is to be transmitted to the user by evaluating a set of notification rules to determine;

wherein a first notification rule in the set specifies a list of users to which notifications are not to be transmitted, and evaluating the first notification rule comprises determining whether the user is in the list of users;

wherein a second notification rule in the set specifies a threshold distance, and evaluating the second notification rule comprises determining whether a distance, between a first location of a previous authentication attempt with the credentials belonging to the user and a second location from which the authentication attempt was made, is below the threshold distance;

wherein a third notification rule in the set specifies a time period in a day during which notifications are not to be transmitted, and evaluating the third notification rule comprises determining whether a current time does not fall within the time period;

transmit the notification to the user when at least one of the notification rules is satisfied.

22. The computer system of claim 21 further configured to determine that the user belongs to a first category that includes high-risk users, and transmitting the notification to an additional user.

* * * * *